3,028,360
METHOD OF INCREASING STORAGE LIFE OF POLYESTER RESIN COMPOSITIONS
Marvin C. Brooks, Grosse Pointe Park, Mich., and Irwin A. Prager, Union City, Conn., assignors to United States Rubber Company, New York, N.Y., a corporation of New Jersey
No Drawing. Filed Nov. 28, 1960, Ser. No. 71,885
5 Claims. (Cl. 260—45.4)

This invention is concerned with improving the storage life of polyester resins. These polyester resins comprise copolymerizable mixtures of unsaturated alkyds and reactive monomers such as described in Ellis, U.S. Patents Nos. 2,255,313 and 2,195,362. The essence of this invention is the use for the said purpose of small amounts of a soluble form of copper in the range .25 p.p.m. to 10 p.p.m. of copper to improve the stabilizing properties of the following classes of stabilizers: phenolics, quinones, aromatic amines, quaternary ammonium salts, amine salts, quaternary phosphonium salts and quaternary arsonium salts.

By "soluble copper compound" is meant any form of soluble copper, soluble in the sense that the compound is soluble in the said polyester resin mixture, and particularly copper salts of an organic acid. Where reference is made herein to amounts of soluble copper in p.p.m., it refers to parts by weight per one million parts of the said copolymerizable resinous mixture.

It is known that large amounts of copper act as inhibitors for free radical polymerization reactions, but the use of trace quantities of copper to improve the action of inhibitors and stabilizers is believed new.

The importance of the invention is that it permits the storage of polymerizable polyesters for periods of time much longer than had previously been possible, without the necessity of refrigeration during periods of warm weather.

The use of this invention affords to the user of polyester resin a more uniform product. It also offers inventory economies to the manufacturer and distributor of polyester resins.

The following examples are given to illustrate the invention without limitation thereto, parts being by weight:

EXAMPLE I

In this example the improvement in the stabilizing properties of hydroquinone which is obtained by using trace amounts of soluble copper in conjunction with the hydroquinone, is demonstrated. The polyester resin used in this example was prepared as follows: 1 mol. of phthalic anhydride, 1 mol. of maleic anhydride, and 2.1 mol. of propylene glycol were reacted to an acid number of about 45; the alkyd was cooled to about 120° C. and hydroquinone stabilizer was added, and thereafter the alkyd was blended with styrene, so that the final mixture contained 67% alkyd and 33% styrene stabilized with .0085% of hydroquinone stabilizer.

To portions of the polyester resin, so prepared, were added varying quantities of copper naphthenate. These quantities were so small that they can best be reported in parts of copper per million (p.p.m.). The portions of the resin were then submitted to an accelerated test for uncatalyzed stability; resin was added to an 18 x 120 mm. test tube to a depth of two inches and the test tube was corked and placed in an oven at 70° C. The samples were observed periodically for signs of gelation; the uncatalyzed stability is reported as the number of hours at 70° C. before gelation commenced.

In Table A are given data showing that the addition of copper in the range 0.5 to 2 p.p.m. of copper increased the uncatalyzed stability several hundred percent. We generally prefer to use amounts of copper salt in this range but for some resins which have great tendency toward instability we may use as much as 5 to 10 p.p.m. of copper in conjunction with the stabilizer. Amounts as small as 0.25 p.p.m. effect a measurable improvement in the stabilizing action of the inhibitor tested.

Table A

| Copper (p.p.m.) added to resin | Hours before Gelation at 70° C. |
|---|---|
| None | 36 |
| 0.5 | 107 |
| 1.0 | 235 |
| 2.0 | 275 |

EXAMPLE II

In this example it is demonstrated that other phenolic type stabilizers can be improved in their stabilizing properties similarly to hydroquinone. A resin similar to that of Example I was prepared and stabilized with .0075% of tertiary butyl catechol. The results of the accelerated stability tests showed that this resin gelled after forty hours at 70° C.; but that a sample to which had been added 1 p.p.m. of soluble copper did not gel until 450 hours had elapsed.

The preferred amount of phenolic type stabilizer used in the practice of this invention is generally in the range 0.005% to 0.025%; however, under special circumstances as little as .001% or as high as 0.1% of stabilizer may be used.

Other examples of phenolic stabilizers which may be used in the practice of this invention are the catechols: 4-ethyl catechol, 3-phenyl catechol, 3-iso butylcatechol.

EXAMPLE III

Quinone and substituted quinones are well known as inhibitors. It has sometimes been suggested that quinone is the active species that results when hydroquinone is used as an inhibitor. However, the effectiveness of copper in improving the stabilizing action of quinone and quinone derivatives is as great as is its effectiveness with hydroquinone, etc. A resin similar to that of Example I was prepared and stabilized with .0050% of quinone. This resin without added copper gelled in 120 hours at 70° C., but with 1 p.p.m. of soluble copper added, it did not gel until after 300 hours at 70° C.

Tetrachloroquinone was tested similarly. A resin containing 0.1000% of tetrachloroquinone gelled after 310 hours at 70° C., but when 1 p.p.m. of soluble copper was added to the resin it was still stable after 400 hours at which time the test was discontinued.

Other quinone type stabilizers can also be used in conjunction with trace amounts of copper, for example, toluquinone.

Quinhydrone can be improved as effectively as hydroquinone and quinone in its stabilizing action by the addition of copper.

The preferred amount of quinone and quinone type stabilizer used in the practice of this invention is generally in the range of .001% to 0.100%.

EXAMPLE IV

In U.S. Patent 2,593,787, Parker claims the use of quaternary ammonium salts of non-oxidizing acids at least as strong as acetic acid as stabilizers for unsaturated polyester resins. In this example it is shown that in the absence of copper these salts are not very effective as stibilizers, but that when trace amounts of copper are used in conjunction with them they are effective stabilizers. It is also demonstrated that the stabilization is not afforded by the trace amounts of copper above since in the absence of the quaternary salt stabilizer, the resin is unstable even though copper is present. A resin similar to that of Example I was freshly prepared and to portions of it were added various quantities of ammonium salt stabilizer and copper naphthenate. Results of accelerated uncatalyzed stability tests are shown in the table below:

Table B

| Stabilizer | Cu (p.p.m.) | Hours before gelation at 70° C. |
| --- | --- | --- |
| .10% Benzyl trimethyl ammonium chloride | None | <2 |
| .10% Benzyl trimethyl ammonium chloride | 1 | >384 |
| .10% Benzyl triethyl-amonium chloride | None | <3 |
| .10% Benzyl triethyl-amonium chloride | 1 | >384 |
| None | 1 | <1 |

The types of quaternary ammonium salts to which can be imparted good stabilizing properties by the addition of trace amounts of copper are adequately described by Parker in U.S. Patent 2,593,787. We prefer to use amounts of these salts in the range of 0.01% to 0.2%.

EXAMPLE V

In U.S. Patent 2,646,416 Parker claims the use of monoamine salts of non-oxidizing acids at least as strong as acetic acid as stabilizers for unsaturated polyester resins. In this example it is shown that the presence of copper improves very greatly the stabilizing action of these salts. To a resin similar to that of Example I, 0.10% of tributyl amine hydrochloride was added, which should according to the teachings of Parker stabilize the resin. However, on being submitted to the accelerated test for uncatalyzed stability, the resin gelled in less than seventeen hours at 70° C. To a portion of the resin containing the amine hydrochloride, 1 p.p.m. of soluble copper was added and on being tested for catalyzed stability, the resin was found to be ungelled after 360 hours at which time the test was discontinued.

The amine salts which can be effectively used in conjunction with the trace amounts of copper are adequately described by Parker in U.S. Patent 2,646,416. We prefer to use amounts of these salts in the range of 0.01% to 0.2%.

EXAMPLE VI

In this example the effect of trace amounts of copper in improving the stabilizing action of aromatic amine stabilizers is shown. To a resin prepared in the same manner as that of Example I, 0.10% of N, N' di B naphthyl p-phenylene diamine, known commercially as Agerite White, was added as a stabilizer. The resin gelled in less than sixteen hours at 70° C. A resin stabilized similarly but to which was added 1 p.p.m. soluble copper, did not gel until after ninety-six hours at 70° C.

Other examples of aromatic amines which can be improved in their stabilizing action by the use of trace amounts of copper in conjunction with them are: N,N'-diphenyl-p-phenylenediamine, p-hydroxy-diphenylamine, p-methyl-p'-sulfonamido-diphenylamine.

In general we prefer to use between .001% and 0.100% of these stabilizers in the practice of this invention.

EXAMPLE VII

In this example the use of quaternary phosphonium salts in conjunction with trace amounts of soluble copper for stabilizing unsaturated polyester resins is demonstrated. These materials have not been described, heretofore, as stabilizers for polyesters. Again, it is found that the presence of the copper is necessary for the salts to stabilize the polyester.

To a resin similar to that of Example I, 0.10% of benzyl triphenyl phosphonium chloride was added; the resin gelled in less than two hours at 70° C. When 1 p.p.m. of soluble copper was added to a resin stabilized similarly, it did not show any signs of gelation after 360 hours at 70° C., at which time the test was discontinued.

The preferred amounts of these salts which are used in conjunction with trace amounts of copper are between 0.01% and 0.2%.

EXAMPLE VIII

In this example the use of quaternary arsonium salts as stabilizers for polyester resins is demonstrated. In order for them to be effective the presence of trace amounts of copper is necessary, also. The use of these materials as stabilizers for polyesters has not been disclosed previously. A resin similar to that of Example I was prepared and to various portions were added small amounts of arsonium salts and copper naphthenate as shown in the following table.

Table C

| Stabilizer | Cu (p.p.m.) | Hours before gelation at 70° C. |
| --- | --- | --- |
| 0.10% Methyltriphenyl-arsonium-chloride | None | <1 |
| 0.10% Methyltriphenyl-arsonium-chloride | 1 | [1] >360 |
| 0.10% Carboxymethyltriphenylarsonium-chloride | 1 | >1200 |
| 0.10% Tetraphenylarsonium-chloride | 1 | 552 |
| 0.10% Benzyl triphenylarsonium-bromide | 1 | 552 |
| 0.10% Methyl triphenylarsonium-iodide | 1 | 264 |

[1] Discontinued.

The preferred amounts of these salts which are used in conjunction with trace amounts of copper are between 0.01% and 0.2%.

EXAMPLE IX

In this example it is shown that soluble copper in several different forms is effective in improving the stabilizing action of a typical quaternary ammonium salt stabilizer. A resin similar to that of Example I was prepared and to separate portions of the resin were added small amounts of soluble copper (2 p.p.m. Cu) and benzyltriethyl ammonium chloride (0.10%). The results of tests for uncatalyzed stability at 70° C. are given in the table below.

Table D

| Copper salt | Hours [1] before gelation at 70° C. |
| --- | --- |
| None | 0–1 |
| Copper naphthenate | 72–136 |
| Copper 3-phenyl salicylate | 384–432 |
| Copper 8-hydroxy quinolate | 192–240 |

[1] The samples were checked periodically. The lower values are the greatest number of hours at which the resin was observed to be free of gel, and the higher values are the number of hours at which the resin was first observed to contain gel.

Examples of additional soluble copper compounds are copper acetate, copper laurate, copper stearate, copper ethylenediamine triacetate, copper citrate, copper benzoate, copper salicylate, copper benzenesulfonate, etc.

Although it might be anticipated that soluble complexes of copper might be less active than the soluble metal salts wherein the copper is not complexed, this does not appear to be the case from the results shown above. All forms of soluble copper appear to have a beneficial effect upon the stabilizing action of the many different types of stabilizers tested.

EXAMPLE X

In this example it is shown that the history of the resin before the addition of the copper and stabilizer can have an important effect upon the uncatalyzed stability of the resin. An alkyd composed of 1 mol. of maleic anhydride and 1 mol. of phthalic anhydride and approximately 2.1 mol. of propylene glycol was prepared and allowed to stand at room temperature for approximately four months; another alkyd prepared similarly was allowed to stand at room temperature for one month. Separate portions of these alkyds were blended with styrene in the ratio of 70 alkyd:30 styrene and were stabilized with hydroquinone and copper naphthenate on the one hand, and benzyltriethyl ammonium chloride and copper naphthenate on the other hand. A third alkyd was prepared and divided into two portions and blended with styrene and stabilized immediately. The results of the uncatalyzed stability tests are given in Table E, and show that much shorter uncatalyzed stabilities are obtained on resins containing the older alkyds which contain the quaternary ammonium stabilizers. Resin X-1 was prepared from the alkyd which was four months old; resin X-2 was prepared from the alkyd which was one month old; and resin X-3 was prepared from the fresh alkyd.

Table E

|  | Hours [1] before gelation at 70° C |  |
|---|---|---|
|  | Resin stabilized with 0.0085% hydroquinone and 1 p.p.m. Cu | Resin stabilized with 0.10% benzyltriethyl ammonium chloride and 1 p.p.m. Cu |
| Resin X-1 | 309-317 | 93-117 |
| Resin X-2 | 348-357 | 221-261 |
| Resin X-3 | 357-365 | 1020-1029 |

[1] The samples were checked periodically. The lower values are the greatest number of hours at which the resin was observed to be free of gel, and the higher values are the number of hours at which the resin was first observed to contain gel.

EXAMPLE XI

In this example it is demonstrated that trace amounts of other metals are not nearly as effective as copper for improving the action of typical stabilizers. Resins similar to that of Example I were prepared and stabilized with 0.10% of benzyltriethyl ammonium chloride and 2 p.p.m. respectively of various metals. Results are given in Table F.

Table F

| Metal | Type of Salt | Hours before gelation at 70° C. |
|---|---|---|
| None |  | <1 |
| Cu | Copper Naphthenate | 72-136 |
| Cu | Copper 3-phenyl salicylate | 384-432 |
| Fe | Iron Naphthenate | 29-88 |
| Fe | Dicyclopenadienyl iron | 21-22 |
| Mn | Manganous Naphthenate | 1-2 |
| Ce | Cerium Naphthenate | <16 |
| Hg | Mercury Naphthenate | <1 |
| Pb | Lead Naphthenate | <1 |
| Ca | Calcium Naphthenate | <1 |
| Ni | Nickel Naphthenate | <1 |
| Cr | Chromium Naphthenate | <1 |
| Zr | Zirconium Naphthenate | <1 |
| Zn | Zinc Naphthenate | <16 |

As noted above iron has a signficant effect but not as great as copper. In larger quantities manganese and cobalt are somewhat effective. The use of any of these metals in the amounts required discolors the resin badly, however.

EXAMPLE XII

In this example it is demonstrated that the use of copper to improve the action of stabilizers is effective in a variety of polyesters. Resin XII-1 was prepared by reacting 1 mol. of maleic anhydride with 1.05 mol. of diethylene glycol and blending this alkyd with styrene in the ratio of 70 alkyd:30 styrene; the resin was stabilized with approximately 130 p.p.m. of hydroquinone. Resin XII-2 was prepared by reacting 4 mol. moleic anhydride, 1 mol. phthalic anhydride, and 1.6 mol, of dicyclopentadiene with 5.2 mol. of ethylene glycol and blending this alkyd with styrene in the ratio of 68 alkyd:32 styrene; the resin was stabilized with approximately 125 p.p.m. of hydroquinone. Resin XII-3 was prepared by reacting 1.4 mol. maleic anhydride, 0.6 mol. phthalic anhydride and 2.14 mol propylene glycol and blending this alkyd with styrene in the ratio of 67 alkyd:33 styrene; the resin was stabilized with 100 p.p.m. hydroquinone. Resin XII-4 was prepared by reacting 1 mol. maleic anhydride and 1 mol tetrachlorophthalic anhydride with 2.05 mol. ethylene glycol and blending this alkyd with styrene and tricresyl phosphate in the ratio 68 alkyd:16 styrene:16 TCP; the resin was stabilized with 55 p.p.m. hydroquinone.

Resins XII-1, XII-2, XII-3 and XII-4 were tested for uncatalyzed stability and portions of these resins were modified by the addition of 1 p.p.m. of soluble copper and these modified portions were tested also. The results are given in the following table.

Table G

|  | Hours before gelation at 70° C. ||
|---|---|---|
|  | Unmodified | 1 p.p.m. Cu added to resin |
| Resin XII-1 | 213-256 | 295-304 |
| Resin XII-2 | 213-256 | 284-424 |
| Resin XII-3 | 127-136 | 295-304 |
| Resin XII-4 | 213-256 | 550-640 |

The following examples show conclusively that copper in both the cupric and cuprous states may be added as inorganic salts to a resin and that the synergistic action of the copper with quinone, hydroquinone and quaternary chloride inhibitors to delay gelation is not dependent on the anion of copper salt. These inorganic copper salts may be added with the standard inhibitors to the alkyd charge or to the styrene diluted resin to obtain an effective means of increasing the storage life of the copolymerizable compositions.

EXAMPLE XIII (A) A polyester alkyd was prepared by heating together 882 g. of maleic anhydride and 1242 g. of dipropylene glycol through which was bubbled a stream of carbon dioxide. The reaction temperature was ultimately maintained at 200-210° C. until the acid number of the alkyd had fallen to 28. Water was removed in a Dean and Starke trap. The alkyd was cooled to 165° C. at which point 1.12 g. of a 25% solution of hydroquinone in ethylene glycol was added. When the alkyd had cooled to 120° C., 840 g. of styrene was added and the resin cooled to room temperature and stored.

(B) A polyester alkyd was prepared by heating together 882 g. of maleic anhydride, 1242 g. of dipropylene glycol and 0.022 g. of copper sulphate pentahydrate through which was bubbled a stream of carbon dioxide. The reaction temperature was maintained at 200-205° C. until an acid number of 31 was reached. Water of esterification was removed in a Dean and Starke trap. The alkyd was cooled to 120° C. and 840 g. of styrene added. The resin was then cooled to room temperature and placed in a refrigerator at 5° C.

(C) Equal weight of resin A and resin B were combined into a single resin.

Small samples (50 g.) of resins A, B, and C were placed in four ounce jars, sealed, and placed in an oven at 70° C. Sample A gelled between 242 and 250 hours; sample B gelled between 6 and 7 hours, but sample C was not gelled at 294 hours, at which time the test was discontinued.

EXAMPLE XIV (A) A polyester alkyd was prepared by heating together 840 g. diethylene glycol, 159 g. of ethylene glycol, 582 g. of phthalic anhydride, 588 g. of maleic anhydride, and .0089 g. of cuprous chloride through which was passed a slow stream of carbon dioxide. The reaction temperature was maintained at 200-205° C. until the acid number of the alkyd had dropped to 39. Water of reaction was removed into a Dean and Starke trap. The alkyd was cooled to 100° C. and 850 g. of styrene added. When the resin temperature was that of its environment, it was placed in a refrigerator at 5° C.

(B) A polyester alkyd was prepared by heating together 1679 g. of diethylene glycol, 318 g. of ethylene glycol, 1184 g. of phthalic anhydride, and 1176 g. of maleic anhydride through which was passed a slow stream of carbon dioxide. The reaction temperature was maintained at 200–210° C. until the acid number had fallen to 36. The alkyd was then cooled to 125° C. and stored at room temperature.

A portion of the alkyd was rewarmed to 130° C. and a quantity of 60% benzyl trimethyl ammonium chloride in water added such that the final resin contained 1600 parts of the quaternary salt per million of the resin. Styrene was added at 100° C. to make a fluid resin which contained 30% styrene.

(C) Equal quantities of resins A and B were combined to form a homogeneous resin.

50 g. each of resins A, B, and C were placed in 4 ounce jars and sealed. Resins A and B both gelled in less than 24 hours at room temperature. Resin C which was placed in an oven at 70° C. did not gel in 98 hours. Gelations had taken place at 107 hours aging at 70° C.

EXAMPLE XV

A polyester alkyd was prepared by heating together 1332 g. of phthalic anhydride, 882 g. of maleic anhydride, and 1471 g. of propylene glycol through which was passed a slow stream of carbon dioxide. The reaction temperature was maintained at 200° C. and the water from the esterification was removed in a Dean and Starke trap. When the acid number had reached 55, the alkyd was cooled. At 140° C. the alkyd was poured into a jar.

A portion (70 parts) of the alkyd just described was broken up into small pieces and dissolved in 30 parts of styrene by agitation at room temperature.

(A) To 370 g. of the styrene resin was added .0013 g. of basic copper carbonate ($Cu(OH)_2 \cdot CuCO_3$). Agitation for 16 hours caused complete solution.

(B) Into 370 g. of the styrene resin was dissolved .0740 g. of quinone at room temperature by agitation.

(C) Equal portions of resin A and resin B were combined to a single resin.

50 g. of each of resins A, B, and C were placed in an oven at 70° C. Resin A gelled in less than 2.5 hours; resin B between 144 and 155 hours; resin C gelled between 120–144 hours.

EXAMPLE XVI

An unsaturated polyester was prepared by heating together 1120 pounds of propylene glycol, 1088 pounds of phthalic anhydride, 721 pounds of maleic anhydride, and 65 pounds of ethylene glycol through which was passed a slow stream of carbon dioxide. The reaction temperature was maintained at 200–205° C. until an acid number of 53 was obtained on the alkyd. Water of esterification was removed in a trap. A one gallon sample was removed and immediately sealed to reduce oxidation.

A resin was prepared by dissolving 827 g. of alkyd just described in 535 g. of styrene at room temperature. The alkyd was previously ground in a mortar to facilitate solution.

(A) To 500 g. of the base resin was added .00174 g. of basic copper carbonate ($Cu(OH)_2CuCO_3$) and solution affected through agitation.

(B) To 375 g. of the base resin was added 1.8 g. of a 33⅓% solution of benzyl triethyl ammonium chloride in methanol. Solution was affected by agitation.

(C) Resins A and B were mixed in equal parts.

Resin A gelled in less than 3 hours at 70° C. Resin B gelled between 7 and 15.5 hours at 70° C., but resin C did not gel until the sample had been aged at 70° C. for 75 hours.

EXAMPLE XVII

An alkyd was prepared by esterifying 882 g. of maleic anhydride and 1242 g. of dipropylene glycol. A slow stream of carbon dioxide was passed through the reactants during the esterification and subsequent blending. After the bulk of water of esterification was removed the temperature was maintained at 200° C. until an acid number of 34 was reached. The alkyd was then cooled to 100° C. and 841 g. of styrene blended into the alkyd to yield a resin.

(A) To a portion of the above resin was added quinone in such amount that the final quantity was 100 p.p.m.

(B) To a portion of the above base resin was added hydroquinone such that the final resin contained 200 p.p.m. of the hydroquinone.

(C) Equal weights of resin A and the resin described in Example IB were blended.

(D) Equal weights of resin B and the resin described in Example IB were blended.

50 gram samples of resins A, B, C, D as described above and the resin described in Example IB were subjected to aging at 70° C. in closed containers. The resin described in Example IB at the time of aging had been stored at a temperature of 5° C. for seven weeks.

| Resin | Inhibitor | Inhibitor Concentration | Copper Concentration | Hours Stable at 70° C |
|---|---|---|---|---|
| IB | None | None | 1.8 | 20–24 |
| VA | Quinone | 100 p.p.m | none | 90–112 |
| VB | Hydroquinone | 200 | none | 147–159 |
| VC | Quinone | 50 | 0.9 | 147–159 |
| VD | Hydroquinone | 100 | 0.9 | 262–281 |

\* Figures shown indicate last period of elapsed time when the test resin was fluid and the elapsed time when the resin had gelled.

This is a continuation-in-part of our application Serial No. 582,934, filed May 7, 1956.

Having thus described our invention, what we claim and desire to protect by Letters Patent is:

1. A method of increasing the storage life of a copolymerizable mixture consisting essentially of a liquid unsaturated polyester resin, said resin being obtained by the esterification of a compound selected from the group consisting of an alpha, beta-ethylenic dicarboxylic acid and the anhydride thereof with a polyhydric alcohol, and a reactive monomeric substance having a $CH_2=C<$ group, the improvement of which consists in adding thereto about 0.001 to 0.2% by weight of a chemical stabilizer selected from the group consisting of phenols, quinones, homocyclic aromatic amines, mono-amine salts, quaternary ammonium salts of non-oxidizing acids at least as strong as acetic acid, quaternary phosphonium halide salts, and quaternary arsonium halide salts and about 0.25 to 10 parts of copper per million parts of copolymerizable mixture, said copper being in the form of a copper salt which is soluble in the liquid polyester, and subsequently storing said mixture as such at ordinary temperatures.

2. A method as in claim 1, wherein the copper salt is copper naphthenate.

3. A method of increasing the storage life of a copolymerizable mixture consisting essentially of a liquid unsaturated polyester resin, said resin being obtained by the esterification of a compound selected from the group consisting of an alpha, beta-ethylenic dicarboxylic acid and the anhydride thereof with a polyhydric alcohol, and a reactive monomeric substance having a $CH_2=C<$ group, the improvement of which consists in adding thereto about 0.001 to 0.2% by weight of a quaternary phosphonium halide salt and about 0.25 to 10 parts of copper per million parts of copolymerizable mixture, said copper being in the form of a copper salt which is soluble in the liquid polyester, and subsequently storing said mixture as such at ordinary temperatures.

4. A method of increasing the storage life of a copolymerizable mixture consisting essentially of a liquid unsaturated polyester resin, said resin being obtained by the esterification of a compound selected from the group consisting of an alpha, beta-ethylenic dicarboxylic acid and the anhydride thereof with a polyhydric alcohol, and a reactive monomeric substance having a $CH_2=C<$ group, the improvement of which consists in adding thereto about 0.001 to 0.2% by weight of a quaternary arsonium halide salt and about 0.25 to 10 parts of copper per million parts of copolymerizable mixture, said copper being in the form of a copper salt which is soluble in the liquid polyester, and subsequently storing said mixture as such at ordinary temperatures.

5. A method of increasing the storage life of a copolymerizable mixture consisting essentially of a liquid unsaturated polyester resin, said resin being obtained by the esterification of maleic acid anhydride with propylene glycol, and a reactive monomeric substance having a $$CH_2=C<$$

group, the improvement of which consists in adding thereto about 0.001 to 0.2% by weight of a chemical stabilizer selected from the group consisting of phenols, quinones, homocyclic aromatic amines, mono-amine salts, quaternary ammonium salts of non-oxidizing acids at least as strong as acetic acid, quaternary phosphonium halide salts, and quaternary arsonium halide salts and about 0.25 to 10 parts of copper per million parts of copolymerizable mixture, said copper being in the form of a copper salt which is soluble in the liquid polyester, and subsequently storing said mixture as such at ordinary temperatures.

No references cited.

Notice of Adverse Decision in Interference

In Interference No. 93,255 involving Patent No. 3,028,360, M. C. Brooks and I. A. Prager, METHOD OF INCREASING STORAGE LIFE OF POLYESTER RESIN COMPOSITIONS, final judgment adverse to the patentees was rendered May 18, 1965, as to claims 1, 2 and 5.

[*Official Gazette July 20, 1965.*]